(12) United States Patent
Cattoor et al.

(10) Patent No.: US 12,442,438 B2
(45) Date of Patent: Oct. 14, 2025

(54) ONE-WAY CLUTCH LAYOUT FOR TORQUE CONVERTOR

(71) Applicant: Dana Belgium N.V., Bruges (BE)

(72) Inventors: Kurt Cattoor, Bruges (BE); Joachim Van Dingenen, Bruges (BE); Filip Schacht, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/166,953

(22) Filed: Feb. 9, 2023

(65) Prior Publication Data

US 2023/0258253 A1    Aug. 17, 2023

(30) Foreign Application Priority Data

Feb. 14, 2022    (DE) .................. 20 2022 100 814.0

(51) Int. Cl.
| | | |
|---|---|---|
| *F16H 41/24* | (2006.01) | |
| *F16H 45/02* | (2006.01) | |
| *F16D 41/064* | (2006.01) | |
| *F16D 41/069* | (2006.01) | |

(52) U.S. Cl.
CPC ............. *F16H 41/24* (2013.01); *F16H 45/02* (2013.01); *F16D 41/064* (2013.01); *F16D 41/069* (2013.01); *F16H 2041/246* (2013.01)

(58) Field of Classification Search
CPC ..... F16H 45/02; F16H 41/24; F16H 2041/246
See application file for complete search history.

(56) References Cited

U.S. PATENT DOCUMENTS

| | | | | |
|---|---|---|---|---|
| 2,596,699 | A * | 5/1952 | Lapsley ............. | F16H 61/0269 477/127 |
| 2,611,452 | A * | 9/1952 | Lapsley ................ | F16H 61/58 60/345 |
| 2,722,133 | A * | 11/1955 | Lapsley ................ | F16H 47/06 74/46 |
| 3,138,969 | A * | 6/1964 | Fisher .................... | F16H 47/08 475/120 |
| 3,192,862 | A * | 7/1965 | Schrader, Jr. .......... | F16H 41/28 416/222 |
| 3,220,185 | A * | 11/1965 | Christenson ........... | F16H 61/64 60/360 |

* cited by examiner

*Primary Examiner* — Dustin T Nguyen
(74) *Attorney, Agent, or Firm* — McCoy Russell LLP

(57) ABSTRACT

The present document relates to a support assembly for a torque converter reaction member, comprising a support member comprising an indentation and a shoulder portion, a retention member partially received in the indentation of the support member, at least one one-way clutch disposed on the support member and defining a rotation axis, and a sleeve member supported on the at least one one-way clutch. At least one of the at least one one-way clutch and the sleeve member is disposed at least partially axially in between the retention member and the shoulder portion of the support member and is axially supported on the retention member and on the shoulder portion of the support member. The present document further relates to a torque converter assembly including said support assembly.

14 Claims, 5 Drawing Sheets

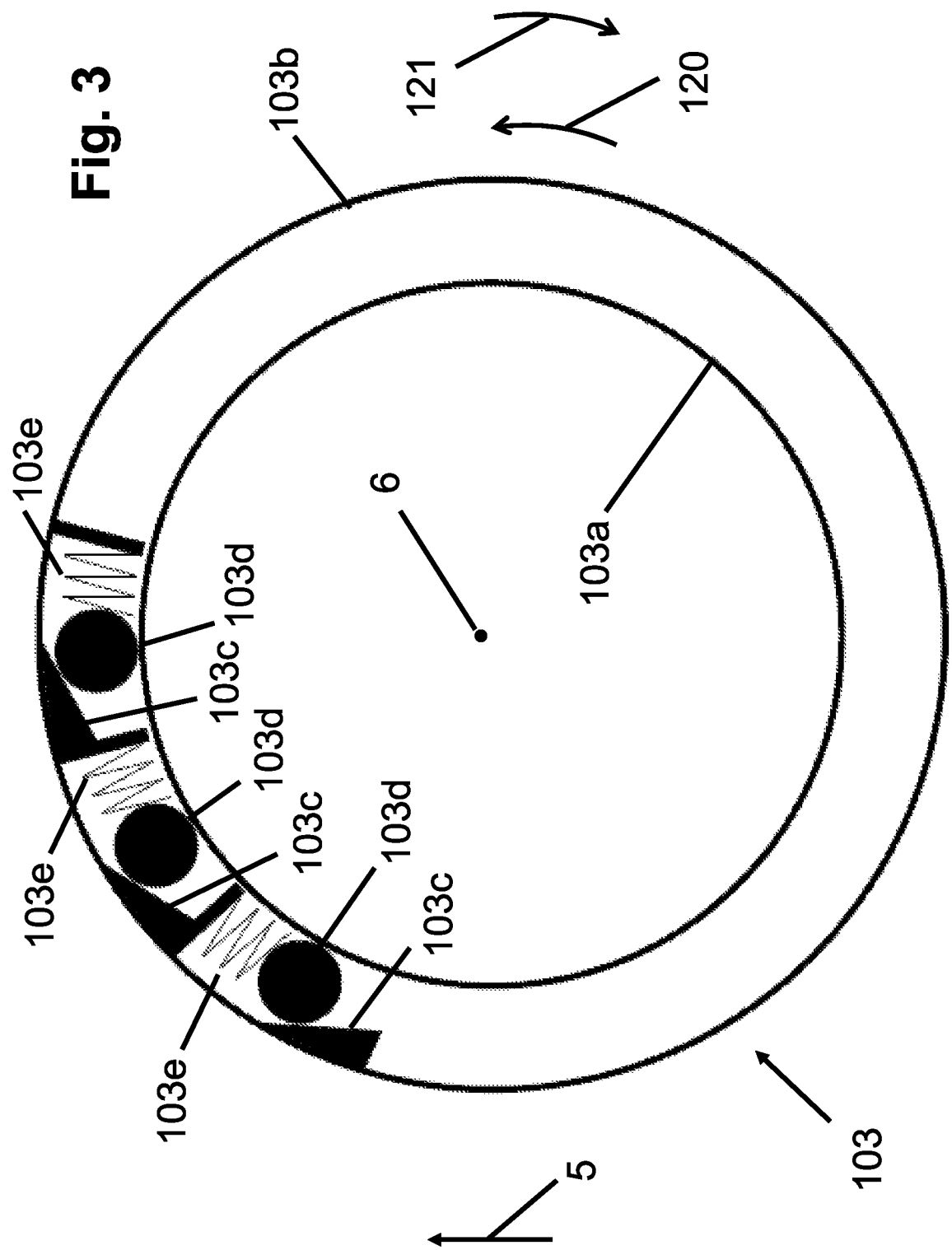

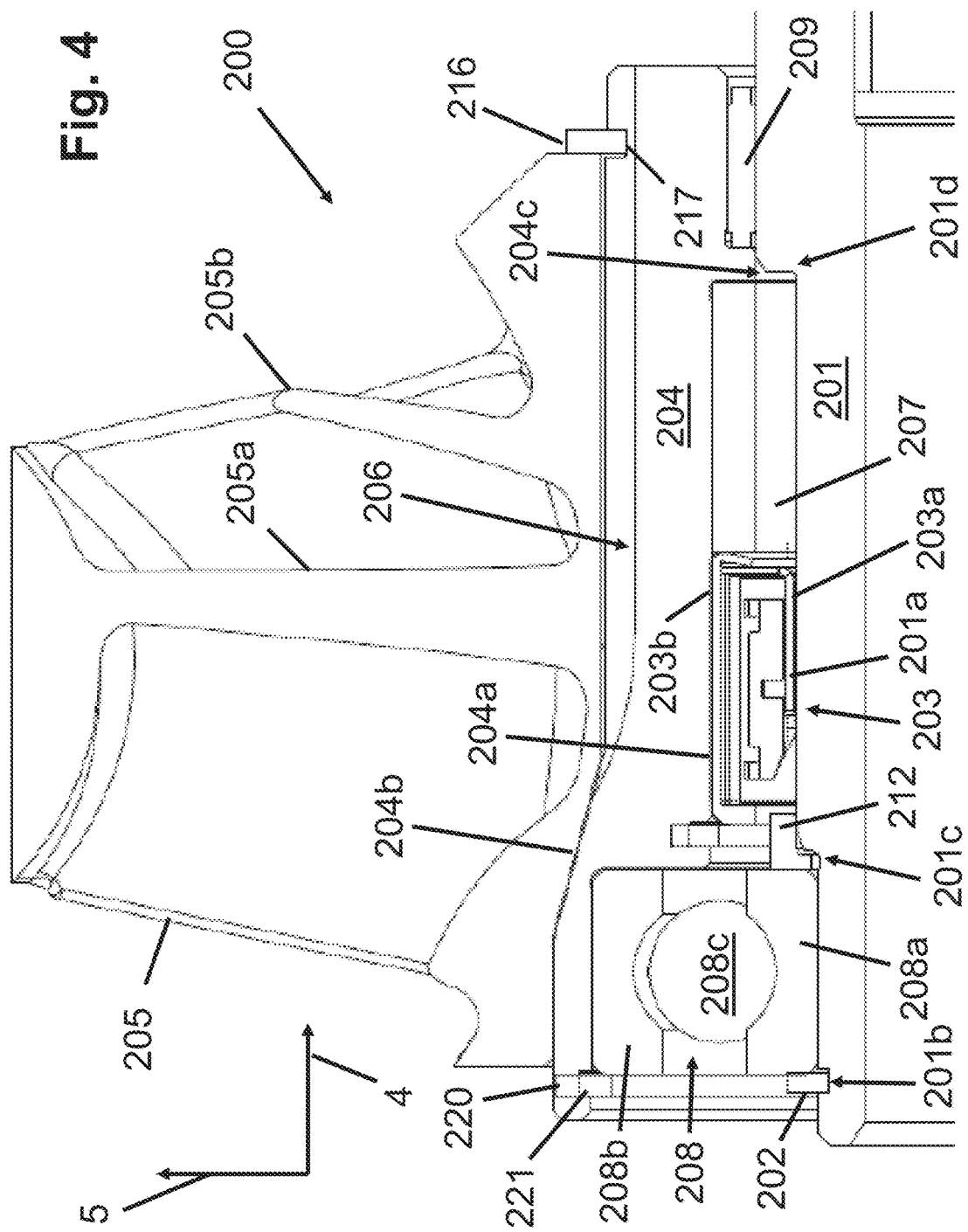

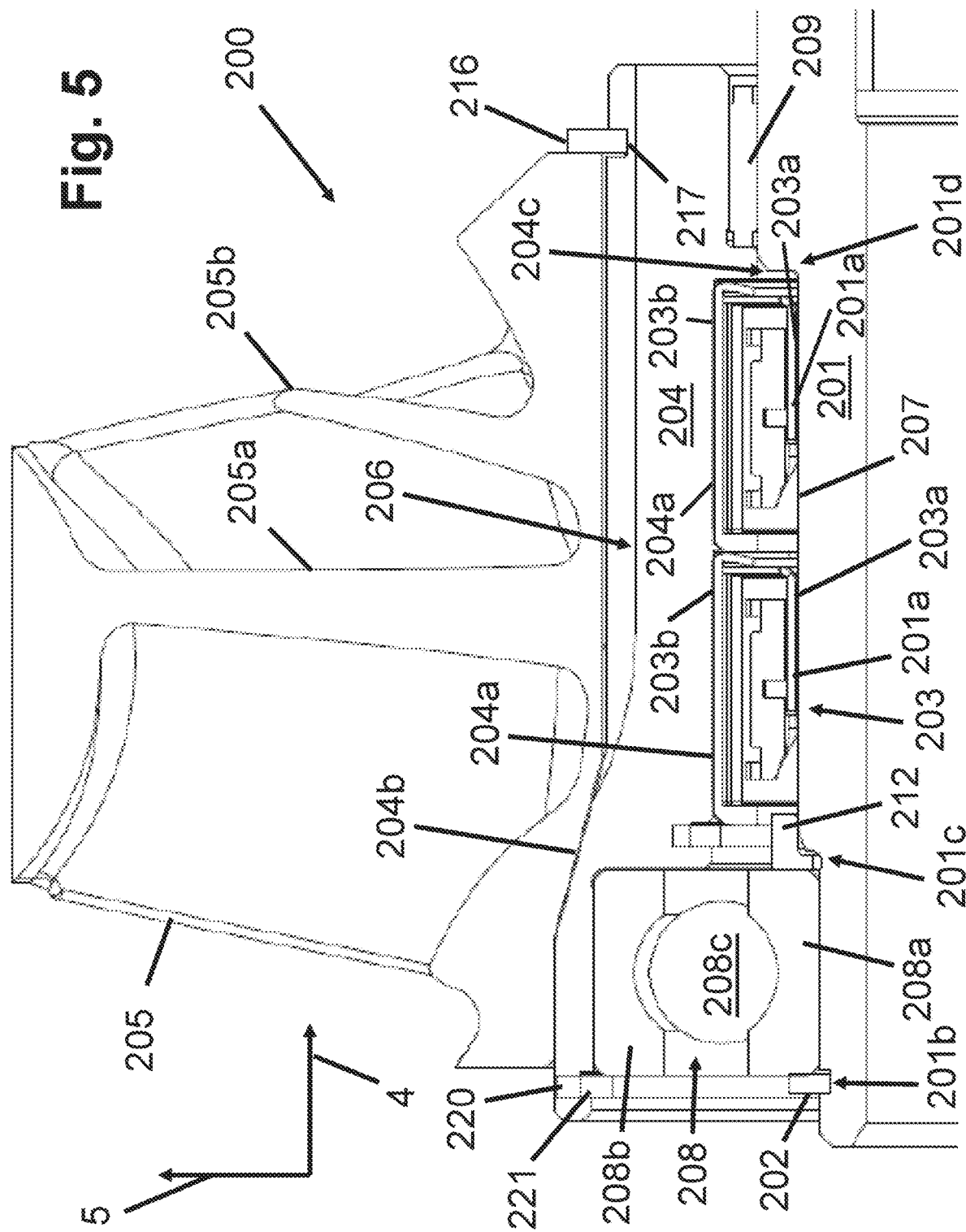

ONE-WAY CLUTCH LAYOUT FOR TORQUE CONVERTOR

CROSS-REFERENCE TO RELATED APPLICATION

The present application claims priority to German Utility Model Application No. 20 2022 100 814.0, entitled "SUPPORT ASSEMBLY FOR A TORQUE CONVERTER REACTION MEMBER", filed Feb. 14, 2022. The entire contents of the above-listed application is hereby incorporated by reference for all purposes.

TECHNICAL FIELD

The present disclosure relates to a support assembly for a torque converter reaction member and to a torque converter assembly including said support assembly. Support assemblies of the presently proposed type typically find application in drivelines for vehicles, such as in drivelines for vehicles with an automatic transmission.

BACKGROUND AND SUMMARY

A torque converter is a hydrodynamic device typically used in drivelines for automotive vehicles such as in a powershift transmissions. A torque converter usually includes an impeller portion coupled to or configured to be coupled to a power source such as an engine or an electric motor, a turbine portion coupled to or configured to be coupled to a transmission, and a reaction member disposed in between the impeller portion and the turbine portion. Along an axial direction defined by a rotation axis of the impeller portion and the turbine portion the reaction member is usually held in place by or supported on the impeller portion and the turbine portion. As the power source drives the impeller portion, the impeller portion pushes a liquid such as oil held within the torque converter toward the turbine portion, thereby driving the turbine portion. The reaction member is usually configured such that liquid returning from the turbine portion toward the impeller portion is deflected off a plurality of curved vanes of the reaction member so as to increase an output torque at the turbine portion with respect to an input torque at the impeller portion.

A drawback of many torque converters is their relatively low efficiency, for example at low torque and high speed. At higher speed ratios between the turbine portion and the impeller portion, such as at speed ratios of 0.75 or above, the efficiency of a torque converter can be improved by providing a one-way clutch, also termed freewheel, between the reaction member and a stationary support portion of the torque converter on which the reaction member is mounted. The one-way clutch is typically configured to prevent the reaction member from counter-rotating with respect to the impeller portion and to allow the reaction member to co-rotate with the impeller portion.

In known torque converters a support assembly for the reaction member is usually designed to be specifically adapted to the layout of the impeller portion and the turbine portion. Consequently, individual components of the reaction member support assembly such as the one-way clutch are typically constructed to fit only one specific torque converter size and layout, thereby potentially creating high costs associated with the planning, production, assembly and maintenance of the torque converter.

Therefore, there is demand for torque converters which can produced, assembled and/or maintained at low cost.

This problem is solved by a support assembly for a torque converter reaction member as described herein and by a torque converter assembly including said support assembly.

The presently proposed support assembly for a torque converter reaction member comprises:
  a support member comprising an indentation and a shoulder portion,
  a retention member partially received in the indentation of the support member,
  at least one one-way clutch disposed on the support member and defining a rotation axis,
  a sleeve member or hub supported on the at least one one-way clutch,
  wherein one or both of the at least one one-way clutch and the sleeve member is/are disposed at least partially axially in between the retention member and the shoulder portion of the support member and is/are axially supported on the retention member and on the shoulder portion of the support member.

Due to the fact that one or both of the at least one one-way clutch and the sleeve member is/are disposed at least partially axially in between the retention member and the shoulder portion of the support member and is/are axially supported on the retention member and on the shoulder portion of the support member, the presently proposed support assembly can be designed to fit more than one specific torque converter size and/or layout. For example, the same one-way clutch layout may be used in different torque converters, such as in torque converters differing in size and/or design. In this manner, the presently proposed support assembly can contribute to lowering costs associated with at least one of the planning, production, assembly and layout of a torque converter or of a torque converter product line including the support assembly.

The support assembly may further comprise a torque converter reaction member supported on the sleeve member and connected to the sleeve member via a torque proof connection. For example, the reaction member and the sleeve member may be connected to one another via a splined connection.

The at least one one-way clutch may comprise two identical one-way clutches. The two identical one-way clutches may then be disposed axially adjacent to one another, for example.

Both the at least one one-way clutch and the sleeve member may be axially supported on the retention member and on the shoulder portion of the support member.

The one-way clutch or the one-way clutches may comprise or may each comprise a sprag-type one-way clutch or a roller-type one-way clutch.

The at last one one-way clutch may be disposed on a cylindrically shaped radially outer surface of the support member. Additionally or alternatively, a radially inner surface of the sleeve member which is supported on the at least one one-way clutch may have a cylindrical shape and a constant radius.

The support assembly may further comprise a first bearing, for example a first axial bearing. For instance, the first bearing may comprise a needle bearing or a roller bearing. One or both of the at least one one-way clutch and the sleeve member may then be axially supported on the retention member via the first bearing. In embodiments where the first bearing comprises a roller bearing, the sleeve member may be radially supported on the first bearing, for example.

The support assembly may further comprise a first radial bushing disposed on the support member. The sleeve member may then be radially supported on the first radial bushing. Additionally or alternatively, one or both of the at least one one-way clutch and the sleeve member may be axially supported on the retention member via the first radial bushing. For example, one or both of the at least one one-way clutch and the sleeve member may be axially supported on the retention member via the first radial bushing and via the first bearing. The first radial bushing may be axially supported on the retention member via the first bearing.

The support assembly may further comprise a second bearing. The second bearing may comprise a needle bearing. One or both of the at least one one-way clutch and the sleeve member may be axially supported on the shoulder portion of the support member via the second bearing.

The support assembly may further comprise a second radial bushing disposed on the support member. The sleeve member may then be radially supported on the second radial bushing. Additionally or alternatively, one or both of the at least one one-way clutch and the sleeve member may be axially supported on the shoulder portion of the support member via the second radial bushing. For example, one or both of the at least one one-way clutch and the sleeve member may be axially supported on the shoulder portion of the support member via the second radial bushing and via the second bearing. The second radial bushing may be axially supported on the shoulder portion of the support member via the second bearing.

The presently proposed torque converter assembly comprises:
  an impeller portion,
  a turbine portion,
  the above-described support assembly, and
  wherein the support assembly is axially disposed in between the impeller portion and the turbine portion.

Embodiments of the presently proposed support assembly for a torque converter reaction member and a torque converter assembly including said support assembly are described in the following detailed description and are depicted in the accompanying drawing.

BRIEF DESCRIPTION OF THE FIGURES

FIG. 3 schematically shows a sectional view of a one-way clutch of the support assembly of FIGS. 1 and 2, wherein the sectional plane of FIG. 3 is arranged perpendicular to the sectional plane of FIGS. 1 and 2.

FIG. 4 schematically shows a sectional view of a second embodiment of a support assembly for a torque converter reaction member.

FIG. 5 schematically shows a sectional view of a further support assembly for a torque converter reaction member.

DETAILED DESCRIPTION

Figure 1:
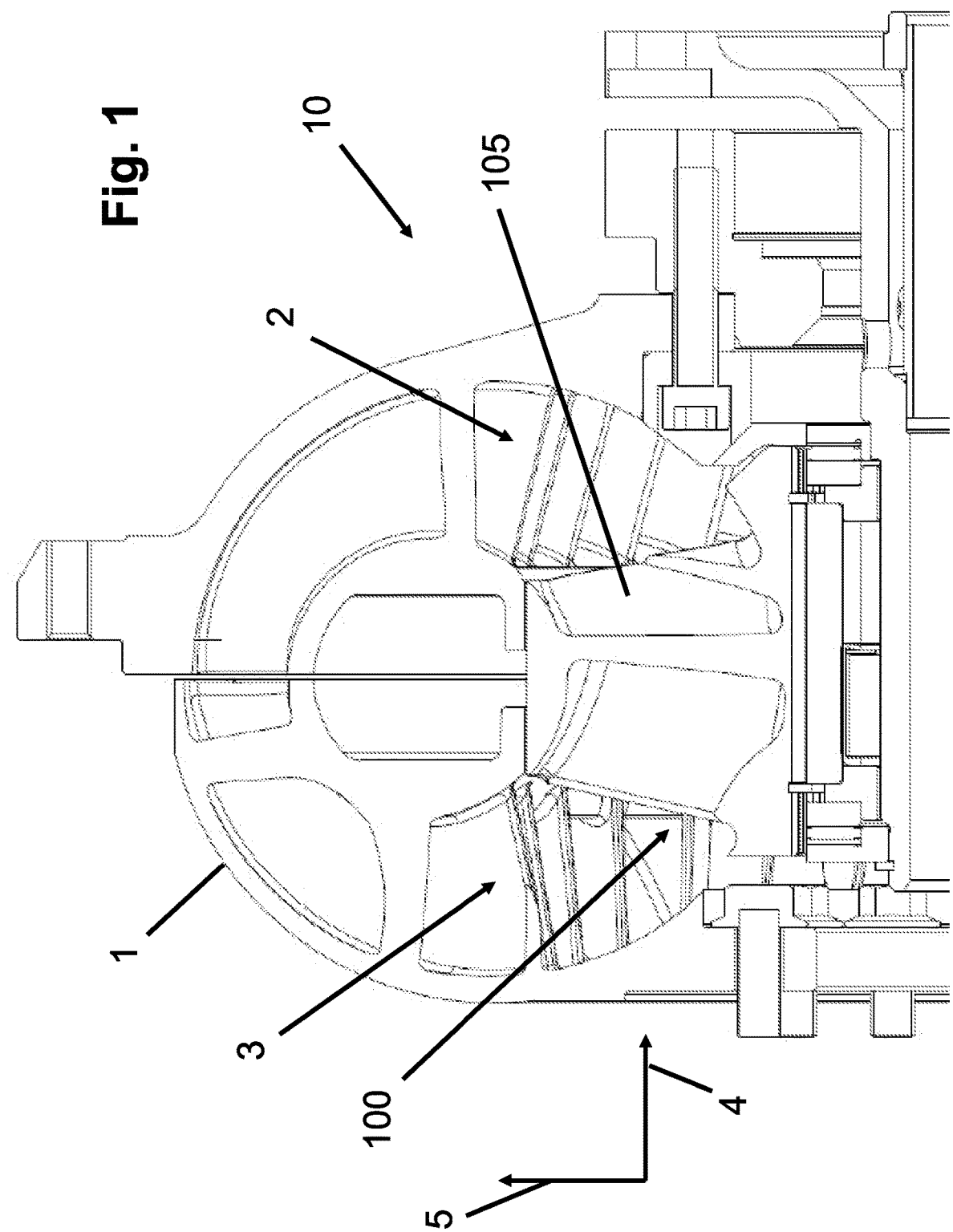
FIG. 1 schematically shows a sectional view of a torque converter assembly including a first embodiment of a support assembly for a torque converter reaction member.
Figure 2:
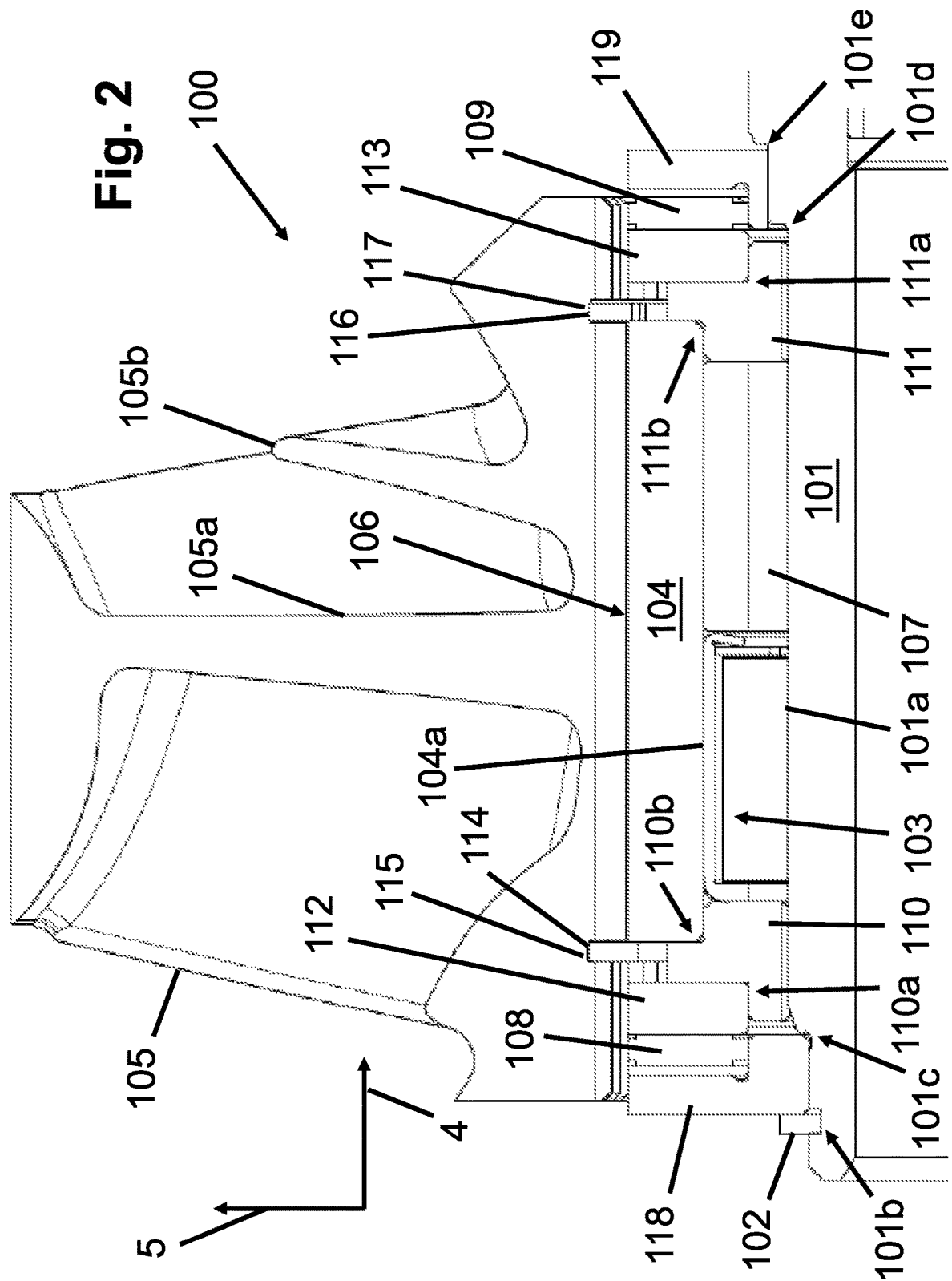
FIG. 2 shows a detail of FIG. 1.

FIG. 1 schematically depicts a sectional view of a torque converter assembly 10 according to a first embodiment. FIG. 2 shows a detail of FIG. 1. The torque converter assembly 10 may be part of or may be configured to be used in a driveline for an automotive vehicle, for example. The torque converter assembly 10 includes a housing 1, an impeller portion 2, a turbine portion 3 and a support assembly 100. In the embodiment depicted in FIG. 1, the support assembly 100 further comprises a reaction member 105. The impeller portion 2, the turbine portion 3 and the reaction member 105 are disposed inside of the housing 1. The impeller portion 2, the turbine portion 3 and the reaction member 105 each have a plurality of vanes. Usually, the impeller portion 2 is drivingly connected or configured to be drivingly connected to a power source such as an internal combustion engine or an electric motor, and the turbine portion 3 is drivingly connected or configured to be drivingly connected to a transmission. The transmission then typically connects or selectively connects the turbine portion 3 to a vehicle output such as to a drive axle of the vehicle.

The impeller portion 2 and the turbine portion 3 are rotatable with respect to a rotation axis 6 (see FIG. 3) running in parallel to an axial direction 4. The rotation axis 6 extends below the portion of the torque converter assembly 10 depicted in FIG. 1. In FIG. 1, the drawing plane includes the rotation axis 6. A radial direction 5 is perpendicular to the axial direction 4. The reaction member 105, too, is configured to rotate in one direction with respect to the rotation axis 6, as will be explained in more detail below. Along the axial direction 4, the support assembly 100 including the reaction member 105 is disposed in between the impeller portion 2 and the turbine portion 3.

When the torque converter assembly 10 is in operation, the housing 1 is filled with a liquid such as oil. The liquid held within the housing 1 provides a liquid coupling between the impeller portion 2 and the turbine portion 3. That is, as the power source drives the impeller portion 2, the vanes of the impeller portion 2 push the liquid held within the housing 1 toward the turbine portion 3. The moving liquid then drives the vanes of the turbine portion 3, thereby causing the turbine portion 3 and any load connected to the turbine portion 3 to rotate. The reaction member 105 disposed between the impeller portion 2 and the turbine portion 3 is configured such that under certain operating conditions, for example when the speed ratio $R=\omega_T/\omega_I$ ($\omega_T$: rotational speed of turbine portion, $\omega_I$: rotational speed of impeller portion) between the turbine portion 3 and the impeller portion 2 is below a threshold ratio, the liquid returning from the turbine portion 3 toward the impeller portion 2 is deflected off the curved vanes of the reaction member 105 (such as off the vanes 105a, 105b depicted in FIG. 2) so as to increase an output torque at the turbine portion 3 with respect to an input torque at the impeller portion 2. The support assembly 100 is configured such that the reaction member 105 may rotate in the same rotational direction as the impeller portion 2, and that rotation of the reaction member 105 in a rotational direction opposite the rotational direction of the impeller portion 2 is blocked.

Additionally, the torque converter assembly 10 may include a mechanical lock-up mechanism (not shown) which allows the turbine portion 3 to be selectively rotationally locked to the impeller portion 2. For example, if the torque converter assembly 10 includes a lock-up mechanism, it may be advantageous to rotationally lock the turbine portion 3 to the impeller portion 2 when the impeller portion 2 is turning at a high speed, for example at a speed above a threshold speed, and provides a low input torque, for example an input torque below a threshold input torque.

FIG. 2 shows a more detailed illustration of the support assembly 100 of FIG. 1. Here and in all of the following, features recurring in different figures are designated with the same reference signs.

The support assembly 100 comprises a support member 101. The support member 101 may be stationary, for example with respect to the vehicle on which the torque converter assembly 10 and/or the support assembly 100 is mounted. The support member 101 has cylindrical symmetry at least in some sections along the axial direction 4. A symmetry axis of the support member 101 coincides with the rotation axis 6. At least in some sections along the axial direction 4 a radially outer surface 101a of the support member 101 facing away from the symmetry axis of the support member 101 or from the rotation axis 6 has a cylindrical shape.

The radially outer surface 101a of the support member 101 forms a first shoulder portion 101c, a second shoulder portion 101d and a third shoulder portion 101e. Each of the axial sections of the radially outer surface 101a divided by the shoulder portions 101c-e may have a cylindrical shape. In the embodiment depicted here, a radius of the radially outer surface 101a of the support member 101 increases at each of the shoulder portions 101c-e from the first (leftmost) end of the support member 101 toward the second (rightmost) end of the support member 101. It is understood that in alternative embodiments of the support assembly 100 the radially outer surface 101a of the support member 101 may have fewer shoulder portions. For example, in some embodiments the radially outer surface 101a of the support member 101 may only comprise or feature the shoulder portion 101e, i.e. the rightmost shoulder portion in FIG. 1.

The support member 101 has at least one indentation 101b. The indentation 101b is formed in the radially outer surface 101a of the support member 101. In the embodiment depicted here, the indentation 101b is formed in the axial section of the radially outer surface 101a extending between the first (i.e. leftmost) end of the support member 101 and the first shoulder portion 101c. The indentation 101b may have an annular shape and may extend over the entire circumference of the radially outer surface 101a of the support member 101. However, it is understood that in alternative embodiments of the support assembly 100 the indentation may not extend over the entire circumference of the radially outer surface 101a of the support member 101. For example, the at least one indentation 101b may include a plurality of indentations formed in the radially outer surface 101a of the support member 101. These indentations may then be disposed at the same position along the axial direction 4 and may be distanced from one another along the circumference of the radially outer surface 101a of the support member 101.

The support assembly 100 further comprises a retention member 102 disposed on the support member 101, more specifically on the radially outer surface 101a of the support member 101. The retention member 102 is partially received in the at least one indentation 101b of the support member 101. The retention member 102 protrudes from the indentation 101b in the radial direction 5. Along the axial direction 4 the retention member 102 is received in the indentation 102 in a form fit. That is, the indentation 101b and the retention member 102 are configured or shaped such that the indentation 101b axially fixes or locks the retention member 102 relative to the support member 101. Or in other words, the indentation 101b and the retention member 102 are shaped such that the retention member 102 may not move relative to the support member 101 along the axial direction 4 or along the rotation axis 6. The retention member 102 may be made of a metal such as steel. However, it is understood that the retention member 102 may be made of or may comprise other materials. The retention member 102 may have an annular or almost annular shape. For example, the retention member 102 may be configured as a snap ring which may be easily pushed or snapped onto the support member 101 and into the indentation 101b formed on the radially outer surface 101a of the support member 101.

The support assembly 100 further comprises a one-way clutch or freewheel 103 and a sleeve member or hub 104. FIG. 3 schematically depicts a sectional view of an embodiment of the one-way clutch 103, wherein the sectional plane of FIG. 3 is arranged perpendicular to the sectional plane of FIGS. 1 and 2. The one-way clutch 103 is radially disposed on and connected to the support member 101. Here, the one one-way clutch 103, or, more specifically, a cylindrically shaped radially inner side or surface of an inner race 103a of the one-way clutch 103 (see FIG. 3), is disposed on and connected to the cylindrically shaped axial section of the radially outer surface 101a of the support member 101 which extends between the shoulder portions 101c and 101d of the support member 101. The sleeve member 104 is radially supported on and connected to the one-way clutch 103. That is, along the radial direction 5 the one-way clutch 103 is disposed in between the support member 101 and the sleeve member 104. Here, a cylindrically shaped inner side or face 104a of the sleeve member 104 is disposed on and connected to a cylindrically shaped radially outer surface of an outer race 103b of the one-way clutch 103 (see FIG. 3) so that the outer race 103b of the one-way clutch 103 and the sleeve member 104 may co-rotate with respect to the rotation axis 6, or so that the outer race 103b of the one-way clutch 103 may prevent the sleeve member 104 from rotating.

The reaction member 105 is radially supported on and connected to the sleeve member 104. Or in other words, along the radial direction 5 the sleeve member 104 is disposed in between the one-way clutch 103 and the reaction member 105. The sleeve member 104 may be made of a metal such as steel, for example. However, it is understood that the sleeve member 104 may be made of or may comprise other materials. The reaction member 105 may be made of a metal such as aluminium, for example. However, it is understood that the reaction member 105 may be made of or may comprise other materials. The reaction member 105 and the sleeve member 104 are connected to one another via a torque proof connection so that the reaction member 105 and the sleeve member 104 may co-rotate with respect to the rotation axis 6. For example, the reaction member 105 and the sleeve member 104 may be connected via a splined connection 106. The splined connection 106 includes radially inwardly protruding splines formed on a radially inner side of the reaction member 105 engaged with radially outwardly protruding splines formed on a radially outer side of the sleeve member 104.

Along the axial direction 4 or along the rotation axis 6, the reaction member 105 and the sleeve member 104 are fixed or locked to one another by a pair of retention members or retention rings 114, 116. The retention rings 114, 116 are partially received in corresponding annular indentations or grooves 115, 217 formed in a radially inner surface or in a radially inner side of the reaction member 105. The retention rings 114, 116 protrude radially inwardly from the annular grooves 115, 217. Along the axial direction 4, the sleeve member 104 is disposed or received in between the retention rings 114, 116 and is supported on the retention rings 114, 116. In this manner, the retention rings 114, 116 prevent the reaction member 105 and the sleeve member 104 from moving relative to one another along the axial direction 4 or along the rotation axis 6.

FIGS. 1-2, and 4, are drawn to scale, although other relative dimensions may be used, if desired.

As can be seen in FIG. 3, the one-way clutch 103 may be of the roller type. Here, the outer race 103b of the one-way clutch 103 comprises a plurality of wedge-shaped portions 103c on a radially inner side thereof. The wedge-shaped portions 103c feature an inner radius which decreases in a circumferential direction 120. Further, the one-way clutch 103 features a plurality of rollers 103d radially disposed in between the inner race 103a and the outer race 103b of the one-way clutch 103. In circumferential direction each one of the rollers 103d is disposed in between two neighboring ones of the wedge-shaped portions 103c of the outer race 103b. Further, each one of the rollers 103d is connected to one of the wedge-shaped portions 103c by means of a spring member 103e. In this way, each of the spring members 103e is configured to push or bias one of the rollers 103d toward the neighboring wedge-shaped portion 103c in the circumferential direction 120 in which the inner radius of the neighboring wedge-shaped portion 103c tapers or decreases.

Consequently, rotation of the outer race 103b relative to the inner race 103a in the circumferential direction 120 results in the wedge-shaped portions 103c releasing the rollers 103d, thereby decreasing friction between the inner race 103a and the outer race 103b. By contrast, rotation of the outer race 103b relative to the inner race 103a in the circumferential direction 121 opposite the circumferential direction 120 results in the rollers 103d being wedged in between the wedge-shaped portions 103c of the outer race 103b and the inner race 103a, thereby increasing friction between the inner race 103a and the outer race 103b and blocking rotation or further rotation of the outer race 103b relative to the inner race 103a in the circumferential direction 121. In other words, the one-way clutch 103 is configured to allow rotation of the outer race 103b relative to the inner race 103a in the circumferential direction 120, and to block rotation of the outer race 103b relative to the inner race 103a in the circumferential direction 121 opposite the circumferential direction 120. Here, the one-way clutch 103 is configured to allow the outer race 103b and the sleeve member 104 and the reaction member 105 connected to the outer race 103b to co-rotate with the impeller portion 2, and to prevent the outer race 103b and the sleeve member 104 and the reaction member 105 connected to the outer race 103b from rotating in a rotational direction opposite the direction of rotation of the impeller portion 2.

Although according to FIG. 3 the one-way clutch 103 is configured as a roller-type one-way clutch, it is understood that in alternative embodiments of the support assembly 100 the one-way clutch 103 may be of another type. For example, the one-way clutch 103 may be configured as a sprag-type one-way clutch. Sprag-type one-way clutches are generally known in the art of automotive transmissions.

FIG. 2 further illustrates that along the axial direction 4 or along the rotation axis 6 both the one-way clutch 103 and the sleeve member 104 are disposed in between the retention member 102 and the shoulder portion 101e of the support member 101. Further, the one-way clutch 103 and the sleeve member 104 are axially supported on the retention member 102 and on the shoulder portion 101e of the support member 101. Or in other words, the retention member 102 and the shoulder portion 101e of the support member 101 axially fix or lock the one-way clutch 103 and the sleeve member 104 relative to the support member 101. That is, the retention member 102 and the shoulder portion 101e of the support member 101 prevent the one-way clutch 103 and the sleeve member 104 from moving relative to the support member 101 in either direction along the axial direction 4 or along the rotation axis 6.

The one-way clutch 103 is axially supported on the retention member 102 via a first radial bushing 110, a spacer ring 112, a first bearing 108, and a spacer ring 118. Along the axial direction 4 or along the rotation axis 6 the first radial bushing 110, the spacer ring 112, the first bearing 108, and the spacer ring 118 are disposed in between the one-way clutch 103 and the retention member 102. It is understood that alternative embodiments of the support assembly 100 may not include all of the first radial bushing 110, the spacer ring 112, the first bearing 108, and the spacer ring 118. And the one-way clutch 103 is axially supported on the shoulder portion 101e of the support member via a spacer 107, a second radial bushing 111, a spacer ring 113, a second bearing 109 and a spacer ring 119. Along the axial direction 4 or along the rotation axis 6 the spacer 107, the second radial bushing 111, the spacer ring 113, the second bearing 109 and the spacer ring 119 are disposed in between the one-way clutch 103 and the shoulder portion 101e of the support member 101. It is understood that alternative embodiments of the support assembly 100 may not include all of the spacer 107, the second radial bushing 111, the spacer ring 113, the second bearing 109 and the spacer ring 119. Specifically, in some embodiments the spacer 107 may be replaced by a second one-way clutch which may be identical to the one-way-clutch 103 depicted in FIG. 2.

Similarly, the sleeve member 104 is axially supported on the retention member 102 via the first radial bushing 110, the spacer ring 112, the first bearing 108, and the spacer ring 118. Along the axial direction 4 or along the rotation axis 6 the first radial bushing 110, the spacer ring 112, the first bearing 108, and the spacer ring 118 are disposed in between the sleeve member 104 and the retention member 102. And the sleeve member 104 is axially supported on the shoulder portion 101e via the second radial bushing 111, the spacer ring 113, the second bearing 109 and the spacer ring 119. Along the axial direction 4 or along the rotation axis 6 the second radial bushing 111, the spacer ring 113, the second bearing 109 and the spacer ring 119 are disposed in between the sleeve member 104 and the shoulder portion 101e.

The first radial bushing 110 and the second radial bushing 111 are each radially disposed or supported on the support member 101. Further, the first radial bushing 110 and the second radial bushing 111 radially support the sleeve member 104. More specifically, the sleeve member 104 is radially supported on a shoulder portion 110b of the first radial bushing 110 and on a shoulder portion 111b of the second radial bushing 111. Similarly, the first radial bushing 110 and the second radial bushing 111 radially support the spacer rings 112, 113, respectively. More specifically, the spacer rings 112, 113 are radially supported on shoulder portions 110a and 111a of the first radial bushing 110 and of the second radial bushing 111, respectively. The spacer rings 118, 119 each have an L-shaped cross section. The first bearing 108 and the second bearing 109 are radially supported on corresponding shoulder portions of the spacer rings 118, 119, respectively. Here, the first bearing 108 and the second bearing 109 are each configured as an axial needle bearing.

FIG. 4 schematically shows a support assembly 200 for a torque converter reaction member according to a second embodiment. For example, in a torque converter assembly such as the torque converter assembly 10 of FIG. 1, the support assembly 100, which is shown in more detail in FIG. 2, may generally be replaced by the support assembly 200 according to FIG. 4.

The support assembly 200 comprises a support member 201. The support member 201 may be stationary, for example with respect to the vehicle on which the torque converter assembly 10 and/or the support assembly 200 is mounted. The support member 201 has cylindrical symmetry at least in some sections along the axial direction 4. A symmetry axis of the support member 201 coincides with the rotation axis 6. At least in some sections along the axial direction 4, a radially outer surface 201a of the support member 201 facing away from the symmetry axis of the support member 201 or from the rotation axis 6 has a cylindrical shape.

The radially outer surface 201a of the support member 201 forms a first shoulder portion 201c and a second shoulder portion 201d. Each of the axial sections of the radially outer surface 201a divided by the shoulder portions 201c, 201d may have a cylindrical shape. In the embodiment depicted here, a radius of the radially outer surface 201a of the support member 201 increases at each of the shoulder portions 201c, 201d from the first (leftmost) end of the support member 201 toward the second (rightmost) end of the support member 201. It is understood that in alternative embodiments of the support assembly 200 the radially outer surface 201a of the support member 201 may have fewer shoulder portions. For example, in some embodiments the radially outer surface 201a of the support member 201 may only comprise or feature the shoulder portion 201d, i.e. the rightmost shoulder portion in FIG. 4.

The support member 201 has at least one indentation 201b. The indentation 201b is formed in the radially outer surface 201a of the support member 201. In the embodiment depicted here, the indentation 201b is formed in the first axial section of the radially outer surface 201a extending between the first (i.e. leftmost) end of the support member 201 and the first shoulder portion 201c. The indentation 201b may have an annular shape and may extend over the entire circumference of the radially outer surface 201a of the support member 201. However, it is understood that in alternative embodiments of the support assembly 200 the indentation may not extend over the entire circumference of the radially outer surface 201a of the support member 201. For example, the at least one indentation 201b may include a plurality of indentations formed in the radially outer surface 201a of the support member 201. These indentations may then be disposed at the same position along the axial direction 4 and may be distanced from one another along the circumference of the radially outer surface 201a of the support member 201.

The support assembly 200 further comprises a retention member 202 disposed on the support member 201, more specifically on the radially outer surface 201a of the support member 201. The retention member 202 is partially received in the at least one indentation 201b of the support member 201. The retention member 202 protrudes from the indentation 201b in the radial direction 5. Along the axial direction 4 the retention member 202 is received in the indentation 202 in a form fit. That is, the indentation 201b and the retention member 202 are configured or shaped such that the indentation 201b axially fixes or locks the retention member 202 relative to the support member 201. Or in other words, the indentation 201b and the retention member 202 are shaped such that the retention member 202 may not move relative to the support member 201 along the axial direction 4 or along the rotation axis 6. The retention member 202 may be made of a metal such as steel. However, it is understood that the retention member 202 may be made of or may comprise other materials. The retention member 202 may have an annular or almost annular shape. For example, the retention member 202 may be configured as a snap ring which may be easily pushed or snapped onto the support member 201 and into the indentation 201b formed on the radially outer surface 201a of the support member 201.

The support assembly 200 further comprises a one-way clutch or freewheel 203 and a sleeve member or hub 204. The one-way clutch 203 may be configured in the same manner as the one-way clutch 103 of FIGS. 1-3. For example, the one-way clutch 203 may be configured as a roller-type one-way clutch, as a sprag-type one-way clutch, or possibly as another type of one-way clutch known in the art of automotive transmissions. For instance, identically constructed one-way clutches may be used in both the support assembly 100 of FIGS. 1-3 and in the support assembly 200 of FIG. 4.

The one-way clutch 203 is radially disposed on and connected to the support member 201. Here, the one one-way clutch 203, or, more specifically, a cylindrically shaped radially inner side or surface of an inner race 203a of the one-way clutch 203, is disposed on and connected to the cylindrically shaped axial section of the radially outer surface 201a of the support member 201 which extends between the shoulder portions 201c and 201d of the support member 201. The sleeve member 204 is radially supported on and connected to the one-way clutch 203. That is, along the radial direction 5 the one-way clutch 203 is disposed in between the support member 201 and the sleeve member 204. Here, a cylindrically shaped inner side or face 204a of the sleeve member 204 is disposed on and connected to a cylindrically shaped radially outer surface of an outer race 203b of the one-way clutch 203 so that the outer race 203b of the one-way clutch 203 and the sleeve member 204 may co-rotate with respect to the rotation axis 6, or that the outer race 203b of the one-way clutch 203 may prevent the sleeve member 204 from rotating.

The reaction member 205 including bent vanes 205a, 205b is radially supported on and connected to the sleeve member 204. Or in other words, along the radial direction 5 the sleeve member 204 is disposed in between the one-way clutch 203 and the reaction member 205. The sleeve member 204 may be made of a metal such as steel, for example. However, it is understood that the sleeve member 204 may be made of or may comprise other materials. The reaction member 205 may be made of a metal such as aluminium, for example. However, it is understood that the reaction member 205 may be made of or may comprise other materials. The reaction member 205 and the sleeve member 204 are connected to one another via a torque proof connection so that the reaction member 205 and the sleeve member 204 may co-rotate with respect to the rotation axis 6. For example, the reaction member 205 and the sleeve member 204 may be connected via a splined connection 206. The splined connection 206 includes radially inwardly protruding splines formed on a radially inner side of the reaction member 205 engaged with radially outwardly protruding splines formed on a radially outer side of the sleeve member 204.

Again, the one-way clutch 203 is configured to allow the outer race 203b and the sleeve member 204 and the reaction member 205 connected to the outer race 203b to co-rotate with the impeller portion 2, and to prevent the outer race 203b and the sleeve member 204 and the reaction member 205 connected to the outer race 203b from rotating in a rotational direction opposite the direction of rotation of the impeller portion 2.

Along the axial direction 4 or along the rotation axis 6, the reaction member 205 and the sleeve member 204 are fixed or locked to one another by a retention ring 216 partially received in and protruding radially outwardly from an annular groove 217 formed in a radially outer surface of the sleeve member 204, and by a bulged portion 204b of the sleeve portion 204 having an increased outer diameter. Along the axial direction 4, the reaction member 205 is supported on and/or retained in between the retention ring 216 and the bulged portion 204b of the sleeve portion 204. In this manner, the retention ring 216 and the bulged portion 204b of the sleeve portion 204 prevent the reaction member 205 and the sleeve member 204 from moving relative to one another along the axial direction 4 or along the rotation axis 6.

FIG. 4 further illustrates that along the axial direction 4 or along the rotation axis 6 both the one-way clutch 203 and the sleeve member 204 are disposed in between the retention member 202 and the shoulder portion 201d of the support member 201. Further, the one-way clutch 203 and the sleeve member 204 are axially supported on the retention member 202 and on the shoulder portion 201d of the support member 201. Or in other words, the retention member 202 and the shoulder portion 201d of the support member 201 axially fix or lock the one-way clutch 203 and the sleeve member 204 relative to the support member 201. That is, the retention member 202 and the shoulder portion 201d of the support member 201 prevent the one-way clutch 203 and the sleeve member 204 from moving relative to the support member 201 in either direction along the axial direction 4 or along the rotation axis 6.

The one-way clutch 203 is axially supported on the retention member 202 via a spacer ring 212 and a first bearing 208. It is understood that alternative embodiments of the support assembly 200 may not include the spacer ring 212. The first bearing 208 supports the sleeve member 204 both in the axial direction 4 and in the radial direction 5. The first bearing 208 is configured as a ball bearing comprising an inner race 208a, an outer race 208b and a plurality of spherical roller members or balls 208c disposed in between the inner race 208a and the outer race 208b. The inner race 208a is radially supported on the support member 201, and the outer race 208b supports the sleeve member 204 both in the radial direction 5 and in the axial direction 4. The spacer ring 212 and the first bearing 208 are disposed in between the one-way clutch 203 and the retention member 202 along the axial direction 4 or along the rotation axis 6. The first bearing 208, or, more specifically, the inner race 208a of the first bearing 208 axially abuts the retention member 202. The first bearing 208, or, more specifically, the outer race 208b of the first bearing 208 is further axially secured to the sleeve member 204 by means of a retention ring 221 which is partially received in protrudes radially inwardly from a groove 220 formed in a radially inner side or surface of the sleeve member 204.

And the one-way clutch 203 is axially supported on the shoulder portion 201d via a spacer 207 and a portion 204c of the sleeve member 204. The spacer 207 and the portion 204c of the sleeve member 204 are disposed in between the one-way clutch 203 and the shoulder portion 201d along the axial direction 4 or along the rotation axis 6. The portion 204c of the sleeve member 204 axially abuts the shoulder portion 201d. In alternative embodiments of the support assembly 200, the spacer 207 may be replaced by a second one-way clutch which may be identical to the one-way clutch 203 depicted in FIG. 4 (e.g., see FIG. 5).

The sleeve member 204 is axially supported on the retention member 202 via the first bearing 208. The first bearing 208 is disposed in between the sleeve member 204 and the retention member 202 along the axial direction 4 or along the rotation axis 6. The sleeve member 204 is axially supported on the shoulder portion 201d by means of the portion 204c. The portion 204c of the sleeve member 204 abuts the shoulder portion 201d of the support member 201. And the sleeve member 204 is radially supported on the support member 201 by means of a second bearing 209. Here, the second bearing 209 is configured as a radial needle bearing. Along the axial direction 4 the first bearing 208 and the second bearing 209 are disposed on opposite sides of the shoulder portion 201d of the support member 201.

Notably, as opposed to torque converter assemblies known from the prior art, the support assemblies 100 and 200 depicted in FIGS. 2 and 4 do not rely on the impeller portion 2 or on the turbine portion 3 to axially fix or lock the one-way clutches 103, 203, the sleeve members 104, 204 and the reaction members 105, 205 relative to the support members 101, 201, respectively. In this manner, the support assemblies 100, 200 or various components of the support assemblies 100, 200 such as the one-way clutches 103, 203 may be used in a number of torque converter assemblies featuring impeller portions and turbine portions of different sizes and shapes. In this way, costs for planning, producing and maintaining torque converter assemblies including the support assembly 100 or the support assembly 200 can be substantially reduced.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A support assembly for a torque converter reaction member, comprising:
    a support member comprising an indentation and a shoulder portion,
    a retention member partially received in the indentation of the support member,
    at least one one-way clutch disposed on the support member and defining a rotation axis, a spacer ring and a first bearing positioned between the at least one one-way clutch and the retention member, the retention member supported on either side by the support member, and
    a sleeve member supported on the at least one one-way clutch, wherein the sleeve member is further in contact with the support member,
    wherein at least one of the at least one one-way clutch and the sleeve member is disposed at least partially axially in between the retention member and the shoulder portion of the support member and is axially supported on the retention member and on the shoulder portion of the support member.

2. The support assembly of claim 1, wherein the torque converter reaction member is supported on the sleeve member and connected to the sleeve member via a torque proof connection.

3. The support assembly of claim 2, wherein the reaction member and the sleeve member are connected to one another via a splined connection.

4. The support assembly of claim 1, wherein the at least one one-way clutch comprises two identical one-way clutches disposed axially adjacent to one another.

5. The support assembly of claim 1, wherein both the at least one one-way clutch and the sleeve member are axially supported on the retention member and on the shoulder portion of the support member, and wherein the at least one one-way clutch is axially supported on the retention member via the spacer ring and the bearing.

6. The support assembly of claim 1, wherein the at least one one-way clutch comprises a sprag-type one-way clutch or a roller-type one-way clutch.

7. The support assembly of claim 1, wherein the at least one one-way clutch is disposed on a cylindrically shaped outer surface of the support member.

8. The support assembly of claim 1, wherein a radially inner surface of the sleeve member which is supported on the at least one one-way clutch has a cylindrical shape.

9. The support assembly of claim 1, further comprising the first bearing, wherein one or both of the at least one one-way clutch and the sleeve member is/are axially supported on the retention member via the first bearing.

10. The support assembly of claim 9, wherein the first bearing comprises a needle bearing or a roller bearing.

11. The support assembly of claim 10, wherein the first bearing comprises a roller bearing and the sleeve member is radially supported on the first bearing.

12. A torque converter assembly, comprising:
    an impeller portion,
    a turbine portion, and
    the support assembly of claim 1,
    wherein the support assembly is axially disposed in between the impeller portion and the turbine portion.

13. The support assembly of claim 1, wherein the retention member is in face sharing contact with the first bearing, and wherein the first bearing is in face sharing contact with the spacer ring.

14. The support assembly of claim 13, wherein the spacer ring is positioned between the first bearing and the at least one one-way clutch.

* * * * *